Figure 8:
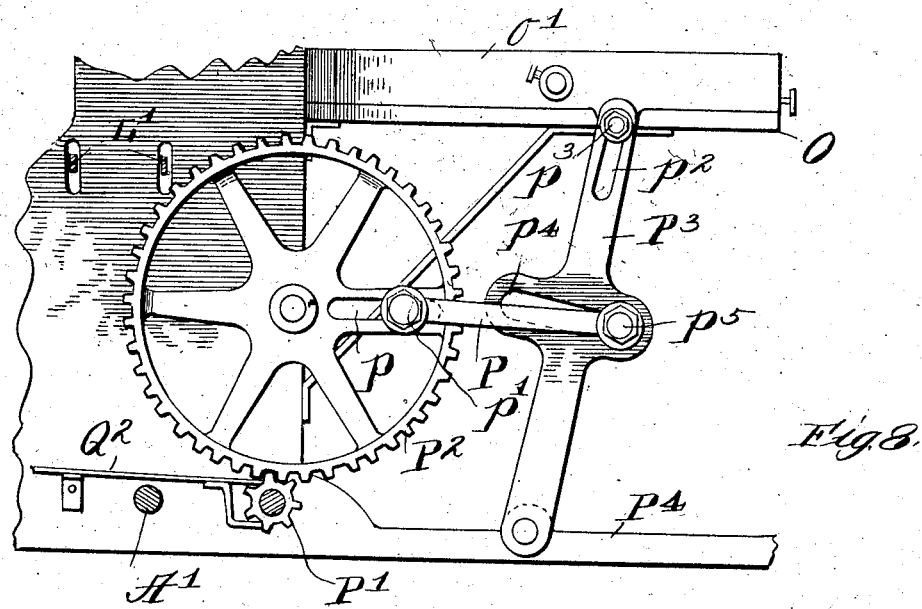

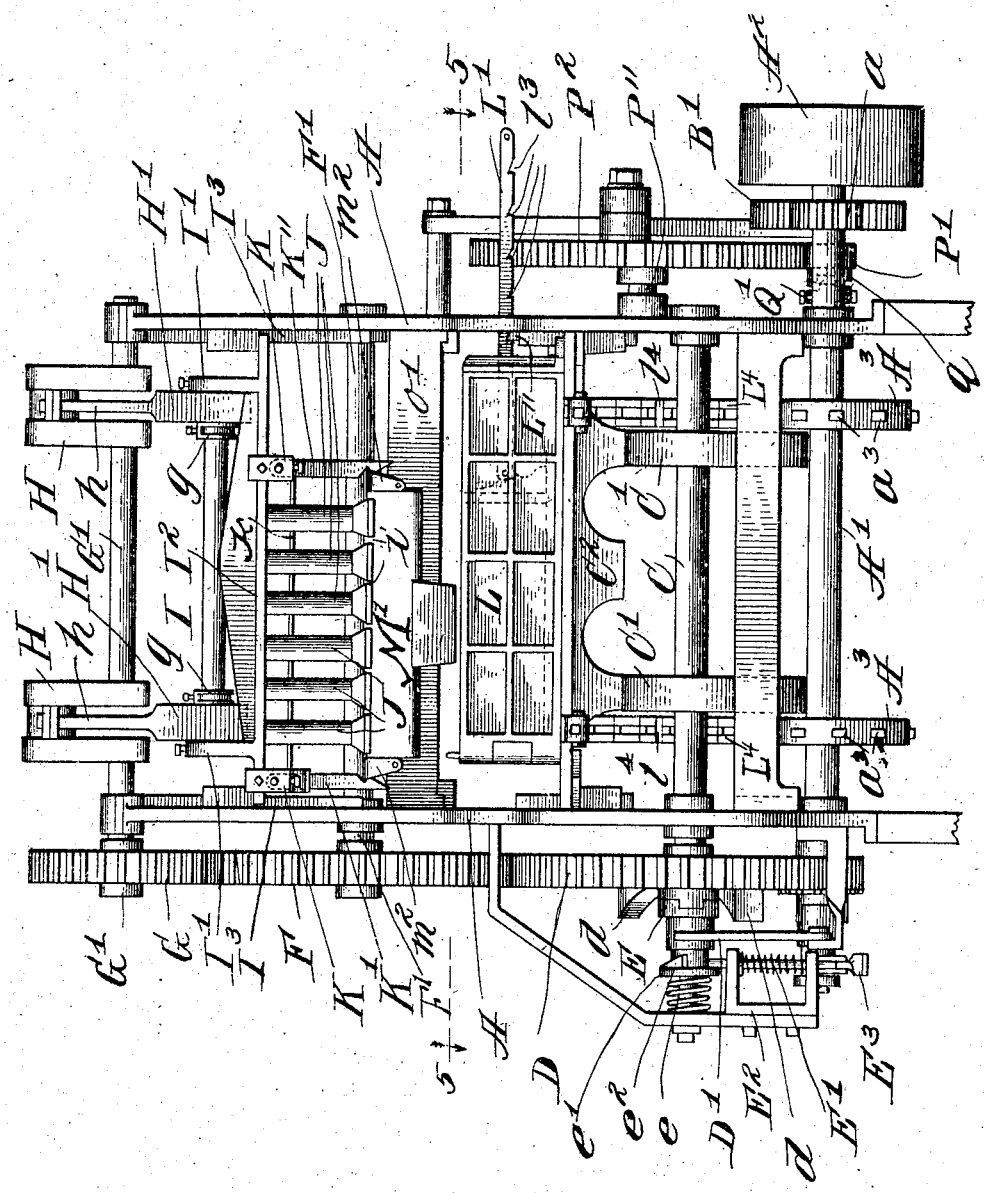

No. 839,125. PATENTED DEC. 25, 1906.
W. DYER.
MOLDING MACHINE.
APPLICATION FILED JAN. 22, 1906.
6 SHEETS—SHEET 2.
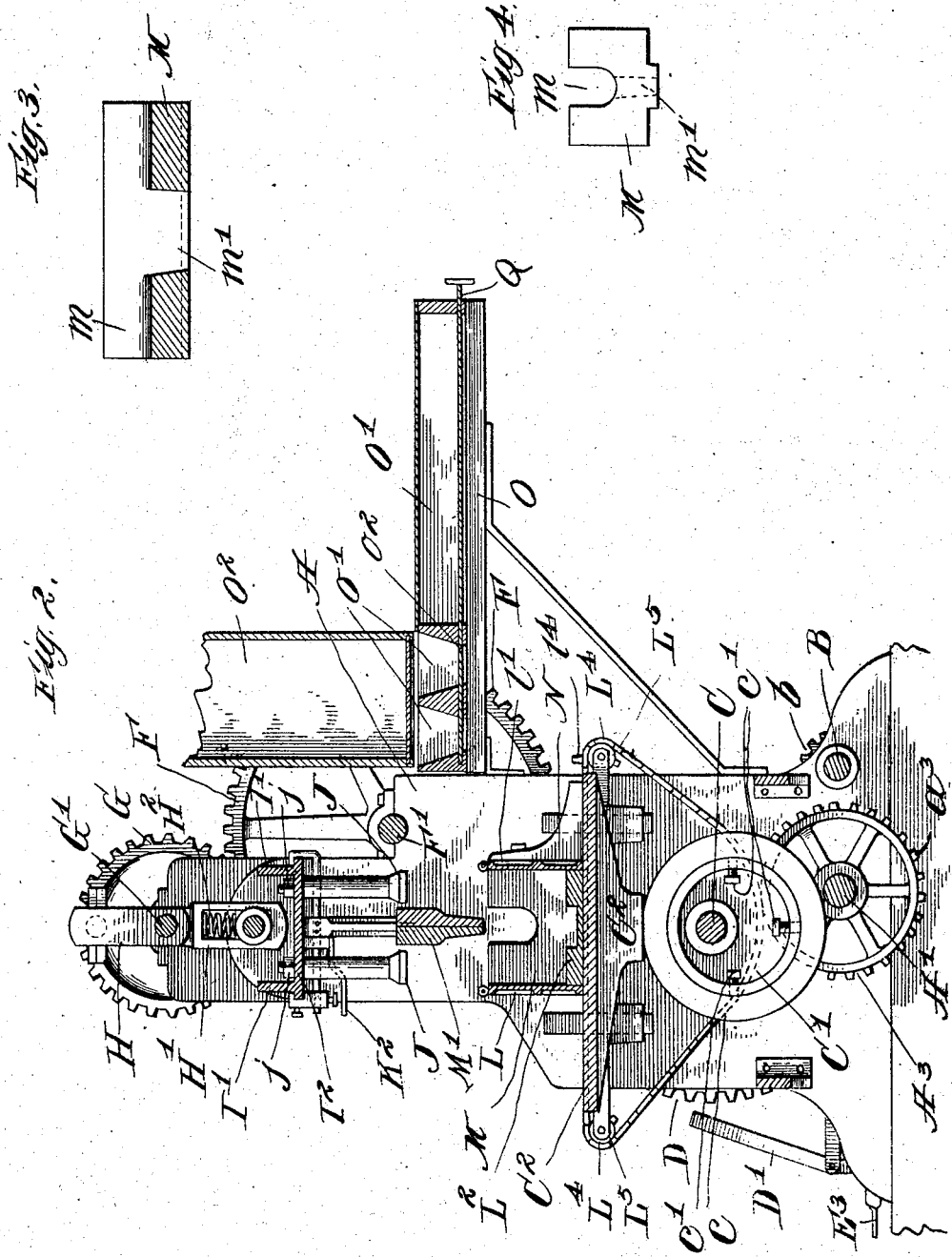
Witnesses:
Inventor
Walter Dyer
By
Norman King
Atty.

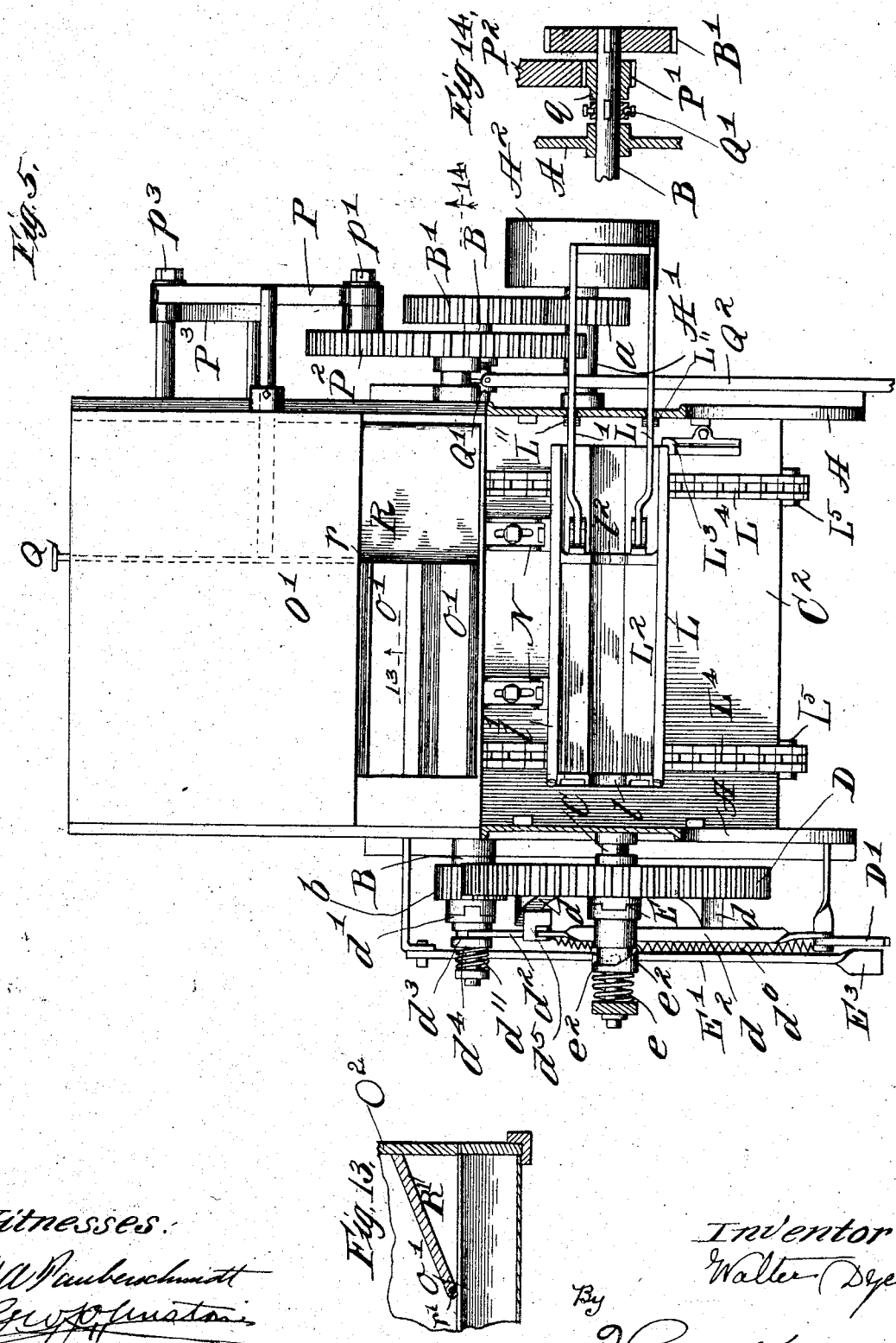

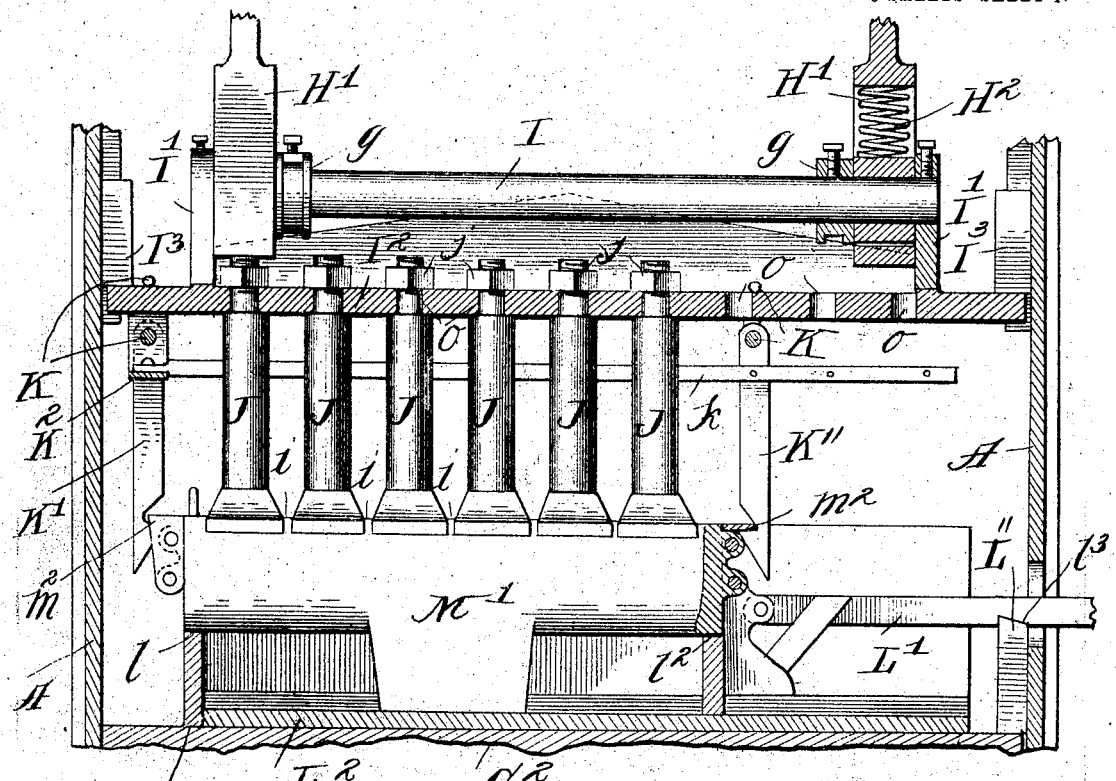
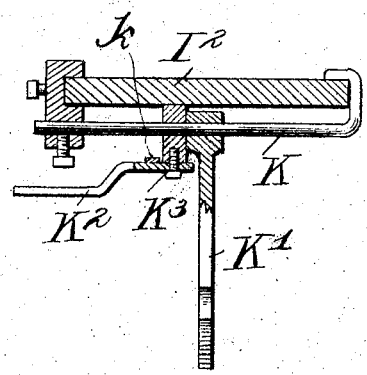

No. 839,125. PATENTED DEC. 25, 1906.
W. DYER.
MOLDING MACHINE.
APPLICATION FILED JAN. 22, 1906.
6 SHEETS—SHEET 5.

No. 839,125. PATENTED DEC. 25, 1906.
W. DYER.
MOLDING MACHINE.
APPLICATION FILED JAN. 22, 1906.
6 SHEETS—SHEET 6.
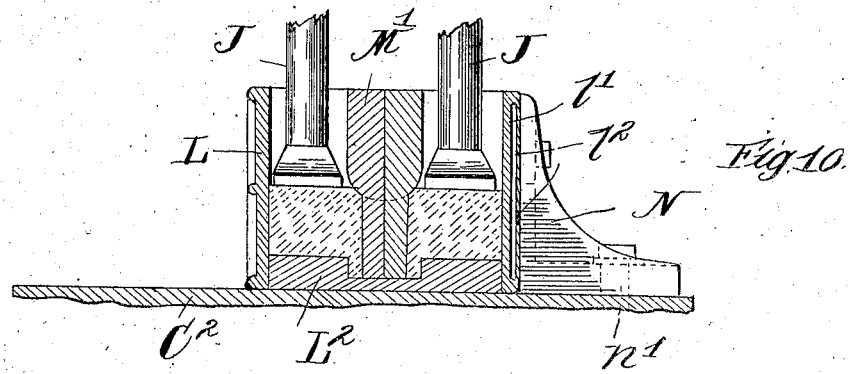
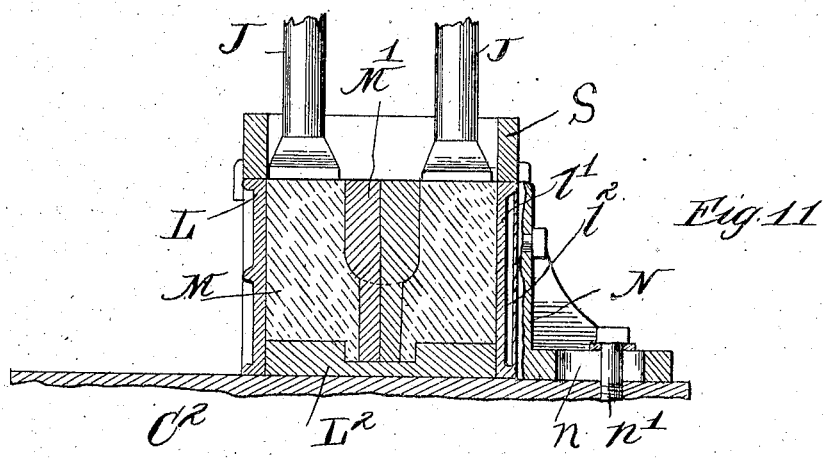
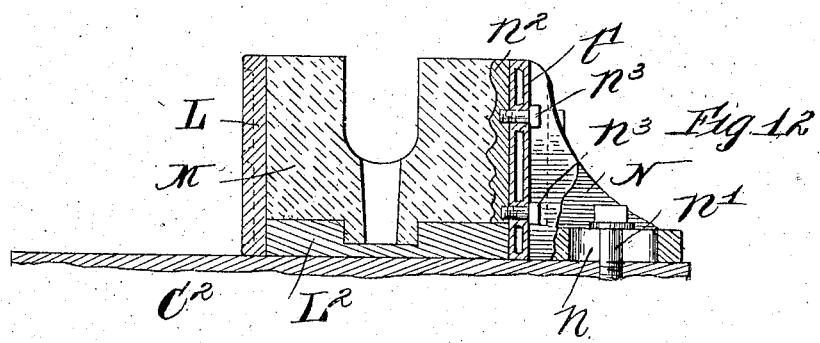
Witnesses
Inventor:
Walter Dyer
By Norman King
Atty

UNITED STATES PATENT OFFICE.

WALTER DYER, OF CHICAGO, ILLINOIS, ASSIGNOR OF ONE-HALF TO WILLIAM E. SHAW, OF CHICAGO, ILLINOIS.

MOLDING-MACHINE.

No. 839,125.     Specification of Letters Patent.     Patented Dec. 25, 1906.

Application filed January 22, 1906. Serial No. 297,361.

*To all whom it may concern:*

Be it known that I, WALTER DYER, a subject of the King of Great Britain, residing in the city of Chicago, county of Cook, State of Illinois, have invented certain new and useful Improvements in Molding-Machines, of which the following is a description.

My invention has for its object the production of a machine for molding articles, sections, or blocks of concrete, cement, pulp, or other plastic material, which shall be either complete in one piece or so formed that a plurality of sections are to be assembled together to form a completed structure—such, for instance, as a wall—in which case the sections are so constructed that they may be forced into locking relation with each other and when assembled and so locked together will form a complete wall, partition, or the like designed for use more particularly in buildings, &c.

A further object of my invention is to construct a machine capable of not only forming such sections so that they may be forced into perfect locking relation with each other, but that such sections shall be so formed in the process of their construction that when assembled together in the completed structure said structure shall have a plurality of horizontal and vertical air-spaces within and throughout the same.

Another object of my invention is to provide such a machine which shall be practically automatic in its operation and one which will produce such articles, blocks, or sections much quicker, cheaper, and more efficiently than is practical by the use of molding-machines as heretofore constructed.

Another object of my invention is to construct such a machine that it may be adjusted to mold or form articles or sections of different shapes and sizes and which is adapted to produce such articles or sections in rapid succession, thereby effecting a great saving in time and expense in the operation of the machine, as well as producing a labor-saving device.

Another object of my invention is to produce a machine for molding such articles or sections which shall be provided with means for pressing the air out of the plastic material being formed in the mold and of providing air-spaces through which said air can escape while the pressure is being applied uniformly over the entire surface of the article or section.

In the accompanying drawings, forming part of this specification, in which like letters of reference indicate like or corresponding parts, I have illustrated one form of device embodying the essential features of my invention, although the same may be carried into effect in other ways without in the least departing from the spirit of my invention, and in these drawings—

Figure 9:
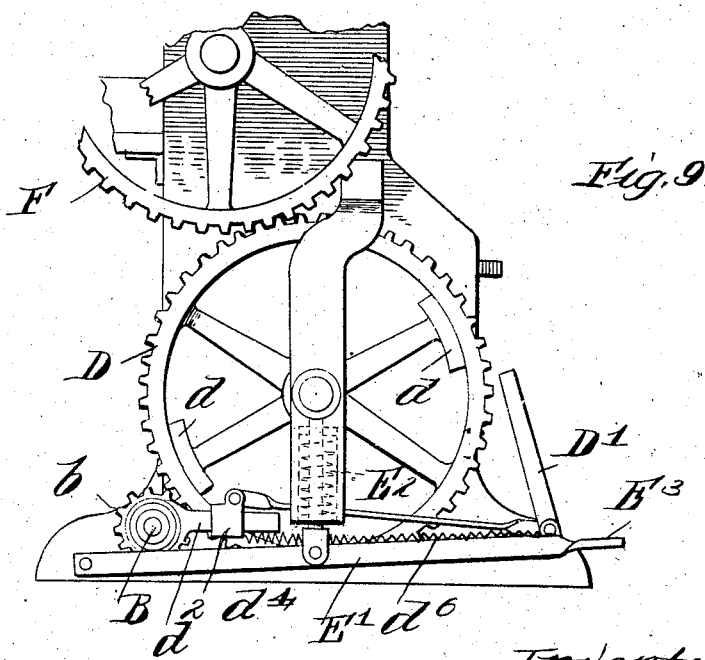

Figure 1 is a front elevation of the complete machine. Fig. 2 is a vertical longitudinal cross-section of the same. Fig. 3 is a longitudinal cross-section of one form of a block or section designed to be constructed by this machine. Fig. 4 is an end view of the same. Fig. 5 is a central transverse section taken on line 5 5 of Fig. 1. Fig. 6 illustrates the pressing mechanism in the act of making the last press in the mold. Fig. 7 is a detail of the mechanism for lifting the core from the mold. Fig. 8 is a detail of the feed-operating mechanism. Fig. 9 is a detail of the clutch mechanism operating on the main driving-gear. Fig. 10 illustrates a cross-section of the mold with the compressors in the position of the first operation. Fig. 11 is a similar view with the compressors in the second operation finishing the section. Fig. 12 illustrates the finished section in the mold with the core withdrawn. Fig. 13 is a sectional detail of the feed-chute and receptacle, taken on line 13 of Fig. 5. Fig. 14 is a sectional view on line 14 of Fig. 5.

In carrying out my invention the frame of the machine is constructed with sides A A, which may be connected together and braced in any desired manner. The main driving-shaft A' is journaled in this frame near the bottom thereof and has mounted thereon the pulley A², which may be driven by any suitable source of power. Mounted also upon the shaft A' are the sprocket-wheels A³ A³, the purpose of which will be hereinafter described.

At the rear of the frame A is journaled a shaft B, having upon one end thereof the pinion b, to which motion is transmitted from the shaft A' through the pinion a, mounted thereon, which meshes with the pinion B'. The pinion b transmits motion to the main driving-wheel D.

C is a shaft journaled in the frame of the machine and carrying thereon the cams C' C', which are adapted to raise and lower the table C² in the operation of the machine. The cams C' are constructed in two parts, as shown more clearly in Fig. 2, the outer rim c being secured to the cam proper, C', by means of the binding-screws c'. When it is desired to regulate the vertical movement of the table C², a rim c of greater or less diameter may be applied to the cam C'.

Upon the left-hand side of the machine looking at Figs. 1 and 5 is the driving-gear D, which meshes with and is driven by a pinion b, mounted upon the shaft B. Carried upon the gear D are two cam projections d d, which are adapted to automatically operate the clutch d', mounted upon the shaft B. The clutch d' is kept in normal position by the tension of spring d''. A rod d² extends in a circumferential recess d³ between the clutch d' and the collar d⁴ and carries thereon a lug or projection d⁵, which extends into the path of the cams d and by them is pushed out of normal position, carrying with it the clutch d'. This mechanism is operated by means of the hand-lever D', which is pivotally connected with the rod d², carrying the projection d⁵, which projection, with the aforesaid lever D', through the spring d⁶, operates the clutch d'.

The clutch E is carried upon the shaft C and is held in normal position under tension of the spring e, Fig. 1. This spring e abuts against a circumferential collar e', which has upon the opposite face thereof the cam projections e² e². A rod E', supported by the hanger E², projects in the path of the cams e² e² and is adapted to be operated by the treadle E to throw the clutch E into and out of engagement with the corresponding clutch member on the shaft C.

An idler F, mounted upon a shaft F', journaled in the frame of the machine, meshes with the gear D and transmits motion to the gear G, which is mounted upon a shaft G', journaled in the top of the frame A, which shaft also supports the cranks H H inside of said frame.

Movably secured in said cranks H H are the arms h h, which extend from boxes or casings H' H', Figs. 1 and 6, inside of which are the compression-springs H² H². A cross-beam I supports the casings H' and springs H², which are held in position thereon by the blocks g.

Bearings I' are secured to the outer ends of the cross-beam I and support the compressor-frame I². The compressors J are removably and adjustably secured to the frame I² by means of the nuts j. Two rows of compressors J are secured in the frame I², each row being arranged to suit the size of the article or section to be compressed, the compressors in each row being arranged in close proximity to each other, but sufficiently far apart to leave an air-space i between each two.

A slot I³ is provided upon each side of the frame A, in which the compressor-frame I² moves vertically when the machine is in operation.

Adjustably secured to each end of the frame I² is a hanger K, Fig. 7, to which are movably secured the latches K' K'', which are operated by the hand-lever K², which is fulcrumed at K³. A cross-rod k connects with the latch K'' and is adapted to be actuated by the lever K² at the same time said lever operates the latch K'. The operator, standing in front of the machine, moves the lever K² to the right, thereby moving the latch K'; which is pivotally secured thereto, to the left. The cross-rod k is secured to said lever K² near the end to which is attached the latch K', and the same operation which has moved the latch K' to the left moves the rod k to the right, carrying with it the latch K'', which is secured thereto, as shown more clearly in Fig. 6.

Supported upon the table C² is a mold or former L, the front and one end l being hinged together and the end l and back l' also being hinged together. The opposite end l², Fig. 6, is secured to the frame L', which is made adjustable lengthwise of the mold and by means of the notches l³ engaging in the standards L'', extending upwardly from the table C². By the lengthwise adjustment of the frame L' the length of the article to be molded is regulated and made either longer or shorter, as desired. A pallet L² is disposed in the bottom of the mold L, which may be of different shapes or configurations, depending upon the article to be formed. This pallet L² is placed inside of the mold before each article or section is formed and is removed therewith. After the pallet is placed in the mold the front of said mold is placed in position, as shown in Fig. 5, and locked by means of the latch or securing member L³, which is pivotally secured to the table C².

A pair of endless chains or belts L⁴ are disposed over the table C² beneath the pallet L². Idler-wheels I⁵ are arranged at the front and rear of the table C², over which the chains L⁴ pass. Recesses or grooves (not here shown) are provided in the table C², in which the chains L⁴ travel. These chains L⁴ drop by gravity beneath the table C², and when the block or section in the mold is ready to be removed the table is in its lowest position, as shown in Fig. 1, with the chains engaging the sprockets a³ on the wheels A³. A stop l⁴ is provided on each of the chains L⁴, which stops are adapted to abut against the rear edge of the pallet L² when it is desired to remove the pallet with the completed section thereon from the machine, as hereinafter described.

Cores of different kinds or more than one of each kind at a time may be used in conjunction with this mold, and for the purpose of forming the longitudinal and vertical openings $m$ $m'$, respectively, in such a block M as I have shown in Figs. 3 and 4 of the drawings a core M' is disposed within the mold L. This core is provided upon each end thereof with a projecting lip or engaging member $m^2$, beneath which the latches K' K'' engage when it is desired to raise or lower the core out of or into the mold, as hereinafter described.

Abutting against the rear face $l'$ of the mold is an adjustable brace N, having an elongated slot $n$, through which is passed a bolt $n'$, by means of which said brace is secured to the table $C^2$ and which may be adjusted to suit the width of the block desired to be made, or in case it is desired to make a block with what is known as a "rock-face" upon one side thereof a mold-face $n^2$ is placed inside of said mold L and secured to the rear thereof $l'$ and is held in fixed position by means of the screws $n^3$, Fig. 12. The rear face $l'$ of the mold is provided with the recess $l^2$ (shown more clearly in Figs. 10 and 11) when the rear brace N is in position, which forms an air-chamber in the face $l'$ of the mold. In the operation of the machine steam is forced into these chambers from a steam-pipe. (Not here shown.) The steam in the aforesaid chamber keeps the rear face $l'$ of the mold hot, so that as the mold is filled with plastic material out of which the article is to be formed the face of the block or article being formed is dried while in the mold, so that when said section is removed from the machine the face thereof is smooth and dry and will not adhere to the face of the mold when removed. As previously described, the height of the article is regulated by means of the rims $c$, which are placed upon the cams C'. The length of said article is regulated by adjusting the frame L', forming one end of the mold, and the width of the article is regulated by an adjustment of the rear brace N. The compressors J are also adjustable in the frame $I^2$ to accommodate different-sized articles, or in case articles of different lengths are desired an additional number of compressors may be secured in the openings $o$ in the frame $I^2$, Fig. 6.

At the rear of the machine is a stationary table O, Figs. 2 and 8, over which travels a movable table O', carrying at one end the receptacles $o'$ $o'$, which receptacles are provided with a false bottom $o^2$. When these receptacles are in their normal position, as shown in Fig. 2, they are directly beneath the chute $O^2$, through which the plastic material out of which the articles are to be formed is fed. The table O', carrying the receptacles $o'$ $o'$, has a reciprocating motion upon the stationary table O and is operated by the following described mechanism:

Loosely mounted upon the driving-shaft B is a pinion P', which meshes with the large gear $P^2$, which gear is mounted upon a bearing secured in the frame of the machine. Mounted also upon the shaft B is a clutch Q', which is adapted to be thrown into and out of engagement with a corresponding clutch member $q$ upon the pinion P'. This clutch is operated by the lever $Q^2$ to throw into and out of operation the mechanism for automatically moving the table O'.

$p$ is an elongated opening through which is passed a bolt or pin $p'$, pivotally securing thereto the shaft P, Fig. 8. A supporting member $P^3$ is pivotally secured at one end thereof to the movable table O' and at the other end to a stationary part $P^4$. $p^2$ is an elongated opening through which said supporting member $P^3$ is pivotally connected to the movable table O'. The supporting member $P^3$ is also provided with an elongated opening $p^4$, extending crosswise thereof, to which is pivotally secured at $p^5$ the opposite end of the shaft P, the object of which is to allow the movable table O' to have a period of rest during part of the revolution of the wheel $P^2$, during which time the material contained in the receptacles $o'$ $o'$ is dropped by gravity into the mold L. In the operation of this part of the mechanism upon the first half of the revolution of the wheel $P^2$ it carries with it the shaft P, also the supporting member $P^3$, which moves forward the movable table O', and upon the latter half of its revolution returns said table to its normal position.

As shown in Fig. 5, the movable table O' is provided with a laterally-adjustable partition R, which is held in fixed position by the set-screws $r$, so that the length of the receptacles $o'$ $o'$ may be easily and readily made to correspond with the length of the mold L, in which the block is to be formed. A corresponding partition R' is provided in the feed-chute $O^2$, which partition is held therein by screws $r'$ or other securing means.

The operation of the machine is as follows: The plastic material out of which the article or section is to be formed is prepared and fed down the chute $O^2$ to fill the receptacles $o'$ $o'$. After the mold has been adjusted to the size desired the pallet $L^2$ is placed in position inside of said mold L and the sides thereof closed and secured in position by the lock $L^3$. The core M' is lowered in position by lowering the compressing mechanism and the beam $I^2$, to which are secured the latches K' and K'', which grip and hold the core in the position shown in Fig. 5. By lowering the compressing mechanism the core M' is lowered into the mold, and while in its lowered position the operator turns the lever $K^2$ outwardly, which carries with it the latch K', and which lever is by the same movement moved into the opposite direction, the rod $k$ carrying upon the opposite end thereof the latch $K''$. Upon releasing the latches $K'$ $K''$ the core is allowed to remain inside of the mold and the compressing mechanism is carried upwardly, leaving the core in the mold, and the mold is ready to be filled with the plastic material to be compressed. The power is applied to operate the machine through the pulley $A^2$, and after the mold and core are placed in position and the receptacles $o'$ $o'$ are filled with material the attendant operates the lever $Q^2$ to throw the clutch $Q'$ into operation to revolve the wheel $P^2$, which through the mechanism heretofore described moves the table $O'$ forward until the receptacles $o'$ $o'$ are directly above the mold L, when an attendant at the rear of the machine pulls the rod Q, which withdraws the false bottom $o^2$ of the receptacles $o'$ and the material contained therein falls by gravity into the mold L. By this time the wheel $P^2$ has completed the last half of its revolution and has immediately carried the movable table $O'$, together with the receptacles $o'$, back to normal position, ready for another load of material. The clutch $Q'$ is then thrown out of operative position until the table $O'$ is to be again advanced. In the meantime an attendant at the opposite side of the machine has operated the lever $D'$ and the treadle $E^3$ to throw the clutches $d'$ and E into operative position, by means of which motion is transmitted to the driving-wheel D and through gears F and G to operate the compressors J to move downwardly, which operation has at the same time transmitted motion to the shaft C, carrying the cams $C'$ $C'$. As soon as the table $O'$ has been started on its backward movement and the clutches $d'$ and E are thrown into operative position the revolution of the cams $C'$ raise the table $C^2$, and with it the mold L, carrying the material to be operated upon. Simultaneously with this movement the cranks H H are forcing the compressors J downwardly upon the material in the mold, which presses the same down into the mold, as shown more clearly in Fig. 10. This first action of the compressors forces the material under the core and presses approximately all of the air out of the same, which escapes through the openings $i$ between said compressors. The upward movement of the cranks H H has carried the compressors back to normal position, and the cams have completed a revolution and lowered the table $C^2$ to normal position, ready to receive material to complete the article being formed in the mold, and the clutches $d'$ E are thrown out of operative position. While the cams are in their upward position an attendant has placed a frame S upon the top of the mold L to receive the next load of material which is to complete the section being molded. The clutch $Q'$ is again thrown into operative position, as before, and the table $O'$ advanced, the material dropped into the mold, and the table $O'$ withdrawn. The clutch $d'$ is again operated as before to lower the compressors, when the final press on the material is made, which completes a block of the shape shown in Figs. 3 and 4. During this time steam has been forced into the chambers $l^3$, which has kept the face $l'$ of the mold hot during the aforesaid operations, thereby drying that face of the block, so that it is ready to leave the mold. While the compressors J are in their lowered position on the final compression of the material, the latches $K'$ $K''$ engage the plate or lip $m^2$ $m^2$ upon each end of the core, and as the compressors are moved to normal position the core is withdrawn from the mold and elevated to the position shown in Figs. 1 and 2. When the compressors J have been raised to their normal position, the table $C^2$ is in its normal position. The chains $L^4$ have engaged the sprockets on the driving-wheels $A^3$, mounted on the main driving-shaft $A'$. An attendant removes the frame S, releases the lock $L^3$, and swings the front and end of the mold away from the block or section which has just been pressed. By this time the stops $l^4$ have traveled over the rear idler-wheels and abut against the edge of the pallet $L^2$, which is free to be moved along with said carriers or chains $L^4$ until it is carried out of the mold and off from the table $C^2$, when it is removed by an attendant. Another pallet is then placed inside of the mold and the operation above described is repeated.

The advantages of my invention will be apparent to those skilled in the art.

My improvements are simple in construction, can be easily manufactured and placed in position, and are very efficient in all respects in the performance of their functions.

I do not desire to be limited to the precise details of construction herein shown, as it is obvious that many of the details thereof might be changed without departing from the spirit of my invention. Neither do I wish to be limited to the construction of a block or building-section of the kind shown in Figs. 3 and 4, as it is obvious by changing the shape of the mold and the core that sections of different sizes, shapes, and configurations might be formed with this machine, the main object of which is to provide a machine which will automatically mold out of plastic material of any kind an article which may be either complete in itself or may be so constructed that the completed article may be made by uniting or assembling sections or parts of an article, such as the one illustrated in the drawings, which is a section of a building-wall so constructed that when the wall is completed it will be provided with a plurality of longitudinal and vertical air-spaces.

I do not desire to be limited to the use of a single core or to the use of any core at all with this machine.

I claim—

1. In a molding-machine, the combination of a supporting-frame, a vertically-movable table inside of said frame, a mold or former carried by said table, means for filling said mold with material to be compressed, vertically-movable compressors coacting with said mold, and means for automatically removing said compressed material from the machine.

2. In a molding-machine, the combination of a supporting-frame, a table movable vertically in said frame, a mold or former and means for adjusting said mold to different sizes, a reciprocating receptacle adapted to fill said mold with material to be compressed, vertically-movable compressors coacting with said mold to compress the material therein, and means for automatically removing said compressed material from the machine.

3. A molding-machine, having a vertically-movable table, a mold supported upon said table and moving therewith, means for filling said mold with material to be compressed, a plurality of compressors supported above said mold, means for simultaneously moving said compressors and mold toward each other, and means for simultaneously moving said compressors and mold away from each other.

4. In a molding-machine, the combination of a supporting-frame, a vertically-movable table inside of said supporting-frame, a plurality of vertically-movable compressors supported above said mold and the aforesaid table, a reciprocating table movable at right angles to the vertically-movable table, and means for alternately operating said reciprocating table and the aforesaid compressors.

5. In a molding-machine, the combination of a supporting-frame, a driving-shaft journaled in said frame, with a vertically-movable table supported inside of said frame and vertically-movable compressing means supported above said table, a longitudinally-reciprocating table supported upon a frame at the rear of the machine, and clutch mechanism adapted to be thrown into and out of contact with the aforesaid driving-shaft to alternately operate the aforesaid reciprocating table and the compressing means.

6. In a molding-machine, the combination of a supporting-frame, a plurality of compressors adjustably secured to a cross-beam movable in said frame, said compressors being arranged out of contact with each other, a vertically-movable table beneath said compressors, a mold and means for adjusting it to different sizes.

7. In a molding-machine, the combination of a supporting-frame, a vertically-movable cross-beam secured in said frame, crank-arms carrying said frame, compression-springs between said crank-arms and the aforesaid cross-beam, a plurality of compressors secured in the aforesaid frame, a vertically-movable table inside of the aforesaid frame, an adjustable mold on said table, and means for simultaneously moving said compressors and table in opposite directions to each other.

8. In a molding-machine, the combination of a vertically-movable table an adjustable mold supported upon said table, a vertically-movable frame, compressors adjustably secured to and movable with said frame, cushioning-springs above said compressors, and means for operating said compressors at certain predetermined intervals.

9. In a molding-machine, the combination of a vertically-movable table, an adjustable mold supported thereon, a vertically-movable frame over said mold, compressors adjustably secured in said frame, a reciprocating table movable laterally with respect to the aforesaid mold, means for alternately operating said reciprocating table and the aforesaid compressors.

10. In a molding-machine, the combination of a supporting-frame, a vertically-movable table, an adjustable mold or former upon said table, means for filling said mold or former with material to be compressed, means for compressing said material and endless carriers operating between said table and mold to automatically carry said compressed material off from the aforesaid table.

11. In a molding-machine, the combination of a supporting-frame, a vertically-movable table, an adjustable former upon said table, vertically-movable compressors supported above said frame, means for simultaneously moving said compressors and table in opposite directions to and from each other, a reciprocating table movable laterally with respect to the aforesaid mold and adapted to fill said mold with plastic material, and means for alternately operating said reciprocating table and the aforesaid compressors to compress said material, and endless carriers movable over said table whereby said compressed material is removed therefrom.

12. In a molding-machine, the combination of a vertical supporting-frame, a main driving-shaft supported in said frame, a vertically-movable table, an adjustable mold on said table, compressing mechanism supported in the aforesaid frame above said mold, clutch mechanism coacting with the aforesaid driving-shaft to operate said reciprocating table to fill the mold with material to be compressed, mechanism for compressing said material, and means for automatically removing said compressed material out of the mold.

13. In a molding-machine, the combination of a supporting-frame, a table, a mold and means for adjusting the length, height and width thereof, a core adapted to be disposed inside of said mold, and means for automatically removing said core.

14. In a molding-machine, the combination of a supporting-frame, a table, a mold or former and means for adjusting the length, height and width thereof, a removable pallet forming the bottom of the mold, a core or cores adapted to be arranged inside of said mold, mechanism for automatically removing said core or cores after the material has been compressed, and mechanism for automatically removing the aforesaid pallet and compressed material away from the machine.

15. In a machine of the class described, the combination of a vertical supporting-frame, compressing mechanism movable in the upper part of said frame, compression-springs coacting with said compressing mechanism, a mold or former, means for filling said mold with plastic material to be compressed, means for operating the aforesaid mechanism to compress the material, and means for automatically removing said compressed material from the machine.

16. In a molding-machine, the combination of a frame supporting the operative mechanism, a mold or former in said frame, a feed-chute, a receptacle beneath said chute, means for filling and discharging the contents of said receptacle into the mold, compressing mechanism coacting with said mold, and means for alternately operating mechanism for filling the mold and the compressing mechanism, and means for automatically removing said compressed material from the machine.

17. In a molding-machine, the combination of an upright frame supporting the operative mechanism, a mold or former supported inside of said frame, downwardly-movable compressing mechanism coacting with said mold, a feed-chute, a reciprocating table, a receptacle or receptacles carried upon said table which in normal position is directly beneath said chute, means for moving said receptacle or receptacles laterally with respect to the aforesaid mold, and means for discharging the material to be compressed into the aforesaid mold.

18. In a molding-machine, the combination of a supporting-frame, a vertically-movable table inside of said frame, a mold or former carried thereon, compressing mechanism above the aforesaid table, and means for simultaneously moving said table and compressing mechanism in opposite directions.

19. In a molding-machine, the combination of a supporting-frame, a vertically-movable table inside of said frame, a mold or former carried thereon, compressing mechanism above the aforesaid table, means for simultaneously moving said table and compressing mechanism in opposite directions, a feed-chute and carrier coöperating therewith, and mechanism for alternately operating said carrier and said compressing mechanism.

20. In a machine of the class described, the combination of a vertically-movable table, an adjustable mold thereon, means for automatically measuring the material to be compressed, means for discharging said material into said mold, vertically-movable compressing mechanism, means for simultaneously raising said table and mold and lowering the compressing mechanism, and means for automatically removing said compressed material from the machine.

21. In a machine of the class described, the combination of a movable table, an adjustable mold carried thereon, compressing mechanism coacting with said mold, receptacles for carrying and discharging a predetermined quantity of material to said mold, means for compressing practically the entire surface of said material at one operation, and means for automatically removing said compressed material from the machine, substantially as described.

22. In a machine of the class described, the combination of a vertically-movable table, an adjustable mold, a compressor or compressors movable toward and away from said mold, receptacles adapted to receive and discharge the material to be compressed into the aforesaid mold, and means for driving said compressors inside of said mold to simultaneously compress all of said material to a uniform density, and means for carrying said compressed material from the machine.

23. In a machine of the class described, the combination of an adjustable mold, a movable receptacle adapted to receive and discharge a predetermined quantity of plastic material in said mold, a compressor or compressors movable independently of said mold, said compressor or compressors being of a size to permit them to fit inside of said mold, air-vents in or between said compressors, means for operating the aforesaid receptacle to discharge into the mold the material to be compressed, means for compressing said material and expelling the air therefrom at one operation, and means for automatically removing said compressed material from the machine, substantially as described.

24. In a machine of the class described, the combination of a vertically-movable table, an adjustable mold carried thereon, a removable pallet in said mold, means for automatically measuring the material to be compressed, means for discharging said material upon the aforesaid pallet, downwardly-movable compressing mechanism adapted to fit inside of said mold, means for compressing all of said material and expelling the air therefrom at one operation, and a carrier adapted to remove the aforesaid pallet and compressed material from the machine, substantially as described.

25. In a machine of the class described, the combination of a movable table, an adjustable mold carried thereon, a removable pallet in said mold, a core or cores in said mold, compressing mechanism and means for operating the same, air-vents in said compressing mechanism, a feed-chute, a movable receptacle beneath said chute adapted to receive and discharge a predetermined quantity of material into said mold, means for operating said compressing mechanism to compress said material to a uniform density at one operation, means for simultaneously releasing said compressing mechanism and withdrawing the aforesaid core or cores, and a carrier operating to remove said compressed material and the aforesaid pallet from the machine.

26. In a machine of the class described, the combination of a supporting-frame, a movable table, an adjustable mold or former supported upon said table, a removable pallet in said mold, a core or cores adapted to be disposed in said mold, a compressor-frame movable in the aforesaid supporting-frame, a compressor or compressors adjustably secured in said frame, cushioning-springs coacting with said compressor or compressors, gripping mechanism carried by the compressor-frame and adapted to raise and lower the aforesaid core or cores into and out of the mold, a feed-chute, a carrier beneath said chute and mechanism coöperating with said carrier to receive and discharge a predetermined quantity of material into the aforesaid mold, means for compressing said material to a uniform density at one operation, and a carrier for removing said compressed material from the machine.

27. In a machine of the class described, the combination of an adjustable mold, compressing mechanism coacting with said mold, means for discharging a predetermined quantity of plastic material in said mold, means for compressing said material and expelling the air therefrom at one operation, and means for automatically removing the compressed material from the machine.

28. In a machine of the class described, the combination of a supporting-frame, a plurality of downwardly-movable compressors adjustably secured in said frame, said compressors being arranged out of contact with each other, an adjustable mold coacting with said compressors, a receptacle adapted to automatically discharge a predetermined quantity of plastic material into the aforesaid mold, mechanism to simultaneously operate the aforesaid compressors to compress all of said material to a uniform density at one operation, and means for automatically removing said compressed material from the machine.

In testimony whereof I have signed this specification in the presence of two subscribing witnesses.

WALTER DYER.

Witnesses:
    PROCTOR P. COOLEY,
    C. F. AMES.